Patented Feb. 10, 1953

2,628,209

UNITED STATES PATENT OFFICE 2,628,209

PROCESS FOR INCREASING VISCOSITY OF UNCURED ALKYD COPOLYMER RESINOUS MIXTURES AND PRODUCT

Charles F. Fisk, Clifton, N. J., assignor to United States Rubber Company, New York, N. Y., a corporation of New Jersey No Drawing. Application October 28, 1947, Serial No. 782,671

4 Claims. (Cl. 260—40)

This invention comprises adding magnesium oxide to resins which are copolymerizable mixtures of polymerizable vinyl compounds and polyolefinic alkyds containing reactive carboxyl groups, and causing polymerization by free radical catalysis after the magnesium oxide has partially or wholly reacted or dissolved. The resulting advantage is that increased viscosity of the copolymerizable mixture can be obtained without the necessity of employing alkyds of very low acid values (i. e., of very high molecular weight). Furthermore, such mixtures on polymerization give resins having many of the properties ordinarily obtained by using an alkyd of low acid value.

The resins employed in this invention are those produced by methods described, for example, in U. S. Patent No. 2,255,313, said resins being polymerizable mixtures comprising at least one monomeric, unsaturated, polymerizable compound containing an ethylenic linkage, and an unsaturated alkyd prepared by reacting an ethylene alpha, beta-dicarboxylic acid with a glycol in such proportion that there are present in the reacting mixture about one carboxyl group of the unsaturated acid to one hydroxyl group of the glycol, to an advanced stage of esterification. The monomeric copolymerizable constituent of the resin contains a terminal $>C=CH_2$ group which preferably is attached to an electronegative group such as the phenyl group as in styrene, halogen as in vinyl chloride, the acetoxy group as in vinyl acetate, or the carbethoxy group as in ethyl acrylate.

It is known that, as the acid value of a given alkyd is decreased, its viscosity and the viscosity of the unpolymerized mixture of such alkyd and the unsaturated monomer increases, with a resultant increase in the hardness and heat distortion temperature of the resin poduced by the copolymerization of the mixture. However, it is usual to use alkyds with an acid value of 30 to 50, because the preparation of alkyds of very low acid values requires a long reaction time involving danger of discoloration and gelation, and because the resulting alkyds frequently are semi-solid and difficult to handle.

According to the present invention, on the addition of magnesium oxide to alkyd monomer mixtures in which the alkyd has a acid value in the range from 10 to 100, and preferably in the range from 30 to 50, a chemical change occurs, even in a short time at room temperature, to give a resin having many of the properties ordinarily obtained by using an alkyd of very low acid value.

Thickening of liquid alkyd monomer resins of moderate viscosity can, of course, be accomplished by the addition of powdered fillers in considerable bulk, for example, barytes, ground silica, etc. It is apparent, however, that the action of such fillers is different from the action of magnesium oxide which offers the advantage of increasing the viscosity when added in relatively small amounts, e. g., 1-15 parts, and preferably 1-7 parts per 100 parts of the alkyd resin component of the polymerizable mixture. When as little as 1% of magnesium oxide (by weight) is used, the viscosity of a resin of initially moderate viscosity is equivalent to that obtained by employing 10 to 25% or more of such fillers as silica, magnesium carbonate, diatomaceous earth, etc., and furthermore, the resin to which magnesium oxide is added is clear and transparent after polymerization. On the other hand, resins containing bulk fillers are opaque. In addition to the clarity of polymerized resin mixtures thickened by magnesium oxide, the tensile and flexural strength of the product are unaffected, and the modulus, hardness, temperature resistance, and resistance to organic solvents are all increased.

Polymerizable systems of the type to which this invention applies are commonly used in the fabrication of laminated articles composed of absorptive or porous sheet materials, such as paper, cloth, or fibrous glass, and a binding material. In preparing these articles. it is customary to impregnate or coat the porous sheet material with the liquid polymerizable material which has been prepared by known methods to yield a product of a viscosity assuring high impregnation. On subsequent heating to cause gelation and polymerization, such resins commonly tend to thin out before gelation and to run off the fabric, causing defects in the article and uneven distribution of the resin. By my invention I prevent such difficulties. The liquid resin into which magnesium oxide has been freshly mixed is of sufficiently low initial viscosity to give good impregnation, and after the material has been allowed to stand a short time the magnesium oxide reacts, causing the viscosity to increase greatly. When the impregnated fabric is then heated for curing, the viscosity remains high enough so that the resin does not run off, and the fabric contains no starved areas.

I may also use my invention in the preparation of liquid polymerizable resins of high viscosity. Such materials usually are compounded with pigments, dyes, catalysts, etc., and it is preferable to add these materials to a low viscosity resin for easy mixing. In this case the magnesium oxide may be added last and allowed to thicken the compounded resin to the desired high viscosity. Such a procedure also obviates the necessity of long reaction time in the preparation of the alkyd.

The polymerizable resin compositions are usually compounded with inhibitors such as hydroquinone, and polymerization catalysts such as benzoyl peroxide, as shown in said U. S. Patent No. 2,255,313. They are usually liquids of moderate viscosity, although in some cases they may be of a waxy consistency at room temperature, changing to a liquid of low viscosity on heating.

The following examples illustrate, without limitation thereto, the method of carrying out my invention:

*Example 1*

Resin A was formulated by dissolving 70 parts of an alkyd, in 30 parts of monomeric styrene containing 0.020 part of p-tertiary butyl catechol as an inhibitor, and 2 parts of benzoyl peroxide as a polymerization catalyst. The alkyd used was prepared by reacting 1.05 mols of diethylene glycol with 1.00 mol of maleic anhydride at 170° C. in an atmosphere of carbon dioxide until an acid number of 45 was attained. Magnesium oxide was added to the resin with high speed stirring, in the form of finely powdered, light calcined magnesia of rubber compounding grade. The behavior and properties of the resin were noted with and without added magnesia and before and after polymerization. Viscosity of the mixed resin composition was tested by measuring seconds bubble rise in a Gardner tube. Castings 1/8 inch thick were prepared by polymerizing the resin composition for one hour at 70° C. plus 3 hours at 110° C. Results obtained were as follows:

|  | A | C | E |
|---|---|---|---|
| Unpolymerized Resin Mix: |  |  |  |
| Resin A | 100 | 100 | 100. |
| MgO | 0 | 2 | 4. |
| Initial viscosity (sec.) | 4 | 4 | 4. |
| Clarity | Clear | Opaque | Opaque. |
| Viscosity after 24 hrs. at 25° C | 4 | 240 | 1,000. |
| Clarity after 24 hrs. at 25° C | Clear | Clear | Clear. |
| Polymerized Resin: |  |  |  |
| Rockwell hardness | M88 | M100 | M100. |
| Distortion temperature, °C | 96 | 108 | 120. |
| Flexural modulus, p. s. i | 350,000 | 420,000 | 460,000. |
| Tensile strength, p. s. i | 8,000 | 8,000 | 8,000. |
| Flexural strength, p. s. i | 11,000 | 11,000 | 11,000. |
| Acetone absorption (weight percent after one week). | 9.3 | 5.9 | 3.8. |

These figures illustrate clearly the unexpected effect obtained by addition of magnesium oxide: extreme thickening of the unpolymerized resin; retention of clarity and strength of the cured resin; increase of hardness, temperature resistance, and resistance to organic solvents such as acetone.

Inasmuch as the polymerized resin is not thermoplastic, the distortion temperature given is the temperature at which the flexural modulus has dropped to 100,000 p. s. i.

*Example 2*

To portions of resin A prepared as in Example 1 were added varying amounts of light calcined magnesium oxide, in order to show the relation between speed of thickening and the amount of magnesium oxide.

| Parts of MgO Added To 100 Parts of Resin Mix | Viscosity (seconds at 25° C.) After Standing at 25° C. for | | |
|---|---|---|---|
|  | 0 Hr. | 2 Hrs. | 20 Hrs. |
| 0 | 4 | 4 | 4 |
| 2 | 4 | 7 | 240 |
| 4 | 4 | 50 | 1,000 |
| 12 | 6 | 1,000 | ---- |

It is apparent from the data that increasing the amount of magnesium oxide markedly increases the viscosity reached in a given time, the sample containing 12 parts attaining a viscosity of 1000 seconds in one-tenth the time required by the sample containing 4 parts to attain the same viscosity.

Resin A was prepared as in Example 1, omitting the benzoyl peroxide catalyst. Magnesium oxide was added and the resin was heated for varying lengths of time at 100° C. The following data show that the effect of addition of magnesium oxide can be brought about more rapidly by heating.

| MgO/100 Resin Mix | Viscosity (seconds at 25° C.) After Standing at 100° C. for | |
|---|---|---|
|  | 0 Hr. | 2 Hrs. |
| 0 | 4 | 4 |
| 1 | 4 | 210 |

It was also observed that a thickened mix with viscosity of 240 seconds at room temperature had a viscosity of 60 seconds at 70° C., a viscosity high enough to prevent run-off during the curing of laminates.

*Example 3*

An alkyd was prepared by reacting 1.05 mols of diethylene glycol and 0.50 mol of maleic anhydride plus 0.50 mol of succinic acid at 170° C. until an acid number of 47 was attained. Using this alkyd, resin B was formulated with styrene, etc., according to the method of Example 1. As in the previous examples, addition of magnesium oxide produced thickening. As shown in the following table, the polymerized resin containing magnesium oxide was found to exhibit considerably different physical properties from those of the blank.

|  | A | B | C |
|---|---|---|---|
| Resin B | 100 | 100 | 100 |
| MgO | 0 | 2 | 4 |
| Shore hardness | A87 | A99 | A100 |
| Tensile (p. s. i.) | 200 | 820 | 1,200 |
| Elongation at break, percent | 30 | 30 | 30 |
| Modulus of $10^5$ (p. s. i.) at temp. of ____°C | −17 | −8 | −4 |
| Modulus of $10^4$ (p. s. i.) at temp. of ____°C | −5 | +13 | +20 |

*Example 4*

An experiment was conducted in a manner similar to Example 1 except that the alkyd constituent of resin C was a diethylene glycol-fumarate of acid value 34.

|  | A | B | C |
|---|---|---|---|
| Unpolymerized Resin Mix: | | | |
| Resin C | 100 | 100 | 100. |
| MgO | 0 | 2 | 4. |
| Initial viscosity | 4 | 4 | 4. |
| Viscosity after 3 hrs. at 25° C. (sec.) | 4 | 12 | 110. |
| Polymerized Resin: | | | |
| Rockwell hardness | M94 | M104 | M104. |
| Flexural modulus | 360,000 | 430,000 | 450,000. |
| Distortion temperature °C | 115 | 140 | 156. |
| Clarity | Clear | Clear | Clear. |

The effect of MgO on this resin, as in the previous examples, was to increase the viscosity of the liquid resin composition and to improve the hardness, modulus, and heat resistance of the cured resin. No sacrifice of clarity resulted from the inclusion of the MgO in the resin mixture.

*Example 5*

The effect of other basic oxides or hydroxides was determined by mixing 1 to 10 parts of the following, finely ground, into 100 parts of the resin A of Example 1:

Magnesium hydroxide
Calcium oxide
Calcium hydroxide
Zinc oxide
Barium oxide
Lead oxide
Potassium hydroxide Of this list the only one which showed any tendency to thicken the resin on standing at room temperature was zinc oxide, but there was no apparent solution of the zinc oxide powder since the mixture remained very cloudy and showed considerable sedimentation.

It appears that finely divided magnesium oxide is unique in giving solubility and clarity combined with the effects on viscosity and physical properties previously mentioned.

While I have shown and described various embodiments of the invention, it is to be understood that the invention is susceptible to other modifications which appear within the spirit of the invention and the scope of the appended claims.

Having thus described my invention, what I claim and desire to protect by Letters Patent is:

1. A composition comprising the product of polymerization of a polymerizable mixture including at least one monomeric, unsaturated, polymerizable component possessing a terminal $>C=CH_2$ group, an unsaturated alkyd resin having an acid number of from 10 to 100 and which is the reaction product of an ethylene alpha,beta-dicarboxylic acid and a glycol, and also including an organic peroxidic catalyst of polymerization, a polymerization inhibitor, and magnesium oxide integrally dispersed throughout the mixture, the amount of magnesium oxide being no more than is capable of dissolving in the composition.

2. A clear, hard, solvent-resistant resin comprising the product of polymerization of a polymerizable mixture including an organic peroxidic polymerization catalyst, at least one polymerizable, unsaturated component possessing a terminal $-CH=CH_2$ group, an unsaturated alkyd resin having an acid number of from 10 to 100 and which is the product of reaction of an ethylene alpha,beta-dicarboxylic acid with a glycol, a polymerization inhibitor, and magnesium oxide integrally dispersed throughout the mixture, the amount of magnesium oxide being from one to seven parts on one hundred parts of the said unsaturated alkyd resin component of the polymerizable mixture.

3. A method of increasing the viscosity of polymerizable resin compositions which are mixtures comprising a polymerization inhibitor, an organic peroxidic polymerization catalyst, at least one monomeric, unsaturated, polymerizable material possessing a terminal $>C=CH_2$ group and an unsaturated alkyd resin having an acid number of from 10 to 100 and which is the reaction product of an ethylene alpha,beta-dicarboxylic acid with a glycol, which comprises the addition of light calcined magnesia to said resin composition, the amount of said magnesia being such that on standing it will completely dissolve in said resin to give a clear solution, and permitting the mixture of said resin and magnesia to stand until solution of the magnesia in said resin has occurred and the desired viscosity with substantially no polymerization has been obtained, and subsequently heating the substantially unpolymerized clear, thickened mixture at a higher temperature at which polymerization is induced, to form a clear, transparent, hard, non-thermoplastic resin body.

4. A process of producing resin-impregnated laminates which comprises adding and integrally dispersing a small amount of magnesium oxide throughout a liquid resin composition which is a peroxide-catalyzed mixture of an unsaturated monomer possessing a terminal $>C=CH_2$ group and an unsaturated alkyd resin having an acid number of from 10 to 100, immediately impregnating porous sheet material with the so-treated composition before it has thickened, allowing the resin to thicken in the impregnated sheets, and thereafter heating to cure the resin in situ.

CHARLES F. FISK.

REFERENCES CITED

The following references are of record in the file of this patent:

UNITED STATES PATENTS

| Number | Name | Date |
|---|---|---|
| 1,950,468 | Zwilgmeyer | Mar. 13, 1934 |
| 2,255,313 | Ellis | Sept. 2, 1941 |
| 2,288,321 | Nordlander et al. | June 30, 1942 |
| 2,386,659 | Clark | Oct. 9, 1945 |
| 2,457,657 | Glick | Dec. 28, 1948 |
| 2,462,042 | Howald et al. | Feb. 15, 1949 |
| 2,568,331 | Frilette | Sept. 18, 1951 |

OTHER REFERENCES

"The Technology of Magnesium and its Alloys," translation by Beck, pp. 292, 293, 300, 302, pub. 1940, by F. A. Hughes & Co. Ltd., London.

"A Comprehensive Treatise on Inorganic and Theoretical Chemistry," by Mellor, p. 292, vol. IV, pub. 1923, by Longmans Green & Co., N. Y.